March 29, 1966 D. F. T. DUNSTER ETAL 3,243,670

MOUNTINGS FOR SEMICONDUCTOR DEVICES

Filed Sept. 30, 1963

Inventors
DAVE F. T. DUNSTER
IAN H. MORGAN
By [signature]
Attorney 3,243,670

MOUNTINGS FOR SEMICONDUCTOR DEVICES

Dave F. T. Dunster and Ian H. Morgan, London, England, assignors to International Standard Electric Corporation, New York, N.Y., a corporation of Delaware Filed Sept. 30, 1963, Ser. No. 320,945
5 Claims. (Cl. 317—234)

This invention relates to semi-conductor devices with particular reference to mounting arrangements for very small devices, such as micro-diodes.

Previous miniaturized structures of this type have been relatively complex and difficult to manufacture. It is therefore an object of the invention to provide a novel simplified semi-conductor arrangement. The device features a glass-metal assembly of at least two elongated metallic members having one end of each embedded without mutual contact in a bead of glass, a semi-conductor element having at least two electrodes, one of which is secured by well-known bonding technique to one of said members to form one lead-out terminal for said element, and a wire connection bonded at one end to the other of said members and at the other end to a second electrode of said element, so as to bridge said glass bead, the said second member acting as a second terminal for said element. The term "glass" as used herein is intended to include within its scope metallized ceramic material having metallized areas to which metallic members may be secured in a known manner by soldering or brazing.

Such a device may comprise several metallic members insulatingly embedded in a bead of glass, and may include a three or more electrode semi-conductor device (transistor, multi-diode assembly, multi-circuit assembly or the like) mounted on one of said members and provided with bridging wire conductors between other of said members and other of said electrodes.

Any of the above devices may be, and preferably is, further encapsulated in a suitable plastic material both to protect the device and also to improve its properties.

The invention will be further described with reference to the accompanying drawing illustrating an embodiment and modifications thereof. In the drawing.

Figure 1:
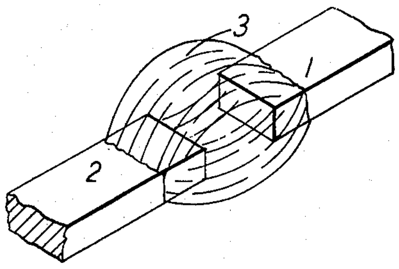
FIG. 1 shows a glass-metal assembly according to the invention, suitable for mounting a semi-conductor diode.

The construction shown in FIG. 1 consists of two metal tapes, 1 and 2, or the flattened ends of round wires, placed a short distance apart, end to end, and secured in position by embedding in a glass bead 3 moulded around their ends. This ensures a rigid structure for the wires or tapes 1 and 2 destined to act both as mount and terminals for a semi-conductor device, and prepared in advance to facilitate assembly of components. The tapes may be 0.02 inch wide (across the larger dimension) and the bead about 0.05 inch in diameter.

Figure 2:
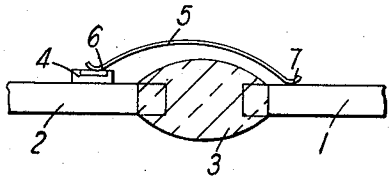
FIG. 2 shows a diode mounted on one of the lead elements of FIG. 1 and connected up.

FIG. 2 shows the elements of FIG. 1 including a diode wafer 4 mounted with one of the electrodes on one wire or tape member 2 near the glass bead, and with a wire connection 5 made between the other electrode 6 of the diode and the other wire or tape member 1, at a point 7 thereof. This gives a rigid assembly for the semi-conductor device without unnecessary strains arising from the fixing of substantial output leads.

Figure 3:
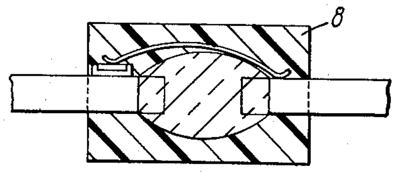
FIG. 3 shows the device of FIG. 2 fully encapsulated after assembly.

FIG. 3 shows the assembled device of FIG. 2 further encapsulated in a plastic material 8, such as epoxy, ceramic, glass polyester, nylon, high density polythene, or any plastic material suitable for moulding by casting, not requiring the use of high pressures. It is important that the material have high electrical resistivity. The bonds made between the diode, the mounting and the connecting wire(s) may be made using any of the well-known techniques, such as friction bonding for the diode to the strip and thermo-compression bonding for the ends of the wire. Alternatively, the contact at 7 in FIG. 2 may be spot welded with advantage. Thermo-compression bonding includes within its scope the "chisel-bond" and the "ball-bond" techniques.

The advantages of this form of construction may be listed as follows:

(a) Simplifies the holding requirements or jigging in the manufacture, since the output leads are rigidly fixed in relation to one another in advance and need not be held in position in an elaborate jig, while the diode or other semi-conductor device is both fixed in relation to the leads and has its electrodes connected to them;

(b) The finished component is strengthened as compared with other forms of mounting;

(c) After the thermal compression bonding process, and before final encapsulation, a full cleaning program is made possible;

(d) The power handling capacity of the device is increased by the glass bead and particularly by the final encapsulation. The heat dissipation surface is made relatively large in this way, and if the encapsulating material is loaded with marble, alumina or other suitable material, heat conductivity is increased still further, so that a factor of increase of ten times in power-handling capacity is attained quite readily.

The preferred technique for making contact to the electrodes of the semi-conductor device, in the case of silicon wafers, involves the use of a fine gold wire. However, the use of other materials for the connection, such as aluminium, silver, palladium, platinum, may also be satisfactory. The glass, which must have high electrical resistivity, is a low melting point solder-glass, which is painted on to the device as a slurry, using an acetone binder. This is then sintered to make a solid mass and to drive off the binder.

Figure 4:
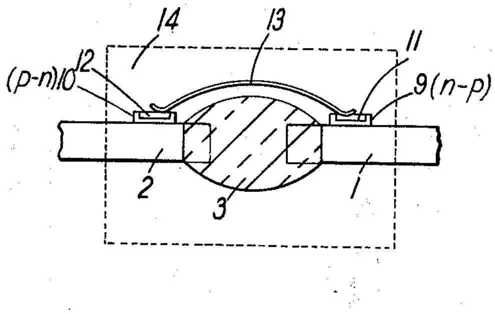
FIG. 4 shows a modification of FIG. 3, comprising a series arrangement of two complementary diodes.
Figure 5:
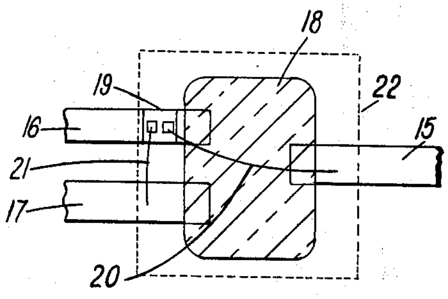
FIG. 5 shows a further modification of FIG. 3, comprising a transistor.

FIGS. 4 and 5 show further applications of the technique described above. In FIG. 4, two diodes are shown joined in series. The basic glass-metal assembly 1–2–3, has diodes 9, 10, mounted on each metal lead, near the bend, the diodes being of opposite polarity types, as indicated, with their upper center electrodes 11, 12 joined directly in series by the conducting wire 13 thermo-compression-bonded at each end, and the whole encapsulated, as indicated by the dotted outline 14.

In FIG. 5, a transistor (3-electrode device) is shown connected to a 3-member glass-metal structure consisting of metal strips 15, 16 and 17 embedded in a glass bead 18, the transistor 19 being mounted on one of the strips, 16, with connecting wires 20, 21, taken from its electrodes to the other strips, 15, 17. The whole is encapsulated to form a block 22.

The preferred materials for the basic glass-metal structure are a glass, that is specially suitable for sealing to metal and a nickel-iron-cobalt alloy (or nickel-iron-chromium alloy) specially suitable for sealing into glass. For the final encapsulation, an epoxy resin is preferred, loaded with a filling material which both increases the thermal conductivity, as mentioned herein, and also reduces the thermal expansivity of the resin from its normally rather high value. The illustrated embodiments are not to be construed as limiting the invention to the exact form or use shown and many other variations may be made in the particular design and configuration without departing from the scope of the invention as set forth in the appended claims.

What is claimed is:

1. A semiconductor mounting arrangement comprising an insulator member, a pair of relatively thin spaced metallic members having flattened ends embedded within and sealed to said insulator, said insulator having a relatively thick cross-section and being molded around said ends, a semiconductor element having two electrodes positioned on one flat surface of one said metallic member adjacent and spaced from said insulator, one electrode being connected directly and bonded to said one member, and a conductor positioned along the outer surface of said insulator connected between and bonded to the second member and the second electrode.

2. The device of claim 1 wherein said insulator member, metallic members, semiconductor element and conductor are encapsulated in plastic material.

3. The device of claim 1 wherein a third metallic member is secured to said insulator and said semiconductor includes a third electrode, a second conductor being connected between said third member and electrode.

4. The device of claim 1 wherein a second semiconductor element having two electrodes is mounted on said second metallic member, said conductor connecting said second electrode to one electrode of said second semiconductor.

5. The device of claim 2 wherein said plastic material is loaded with a filler of high thermal conductivity and low thermal expansivity.

References Cited by the Examiner

UNITED STATES PATENTS

| | | | |
|---|---|---|---|
| 2,688,110 | 8/1954 | Domaleski et al. | 174—52.6 |
| 2,780,758 | 2/1957 | Zetwo | 317—234 |
| 2,799,814 | 7/1957 | Schwartz et al. | 317—234 |
| 2,877,392 | 3/1959 | Koets et al. | 317—234 |
| 2,929,971 | 3/1960 | Van Amstel | 317—234 |
| 2,948,930 | 8/1960 | Herbst | 174—52 X |
| 2,957,038 | 10/1960 | Greenidge et al. | 174—76 X |
| 2,967,984 | 1/1961 | Jamison | 317—234 |
| 3,036,251 | 5/1962 | Brenner | 317—234 |
| 3,081,374 | 3/1963 | Burch | 174—52.6 |
| 3,119,053 | 1/1964 | Yazawa | 317—234 X |
| 3,134,058 | 5/1964 | Walkow | 317—234 X |
| 3,142,000 | 7/1964 | Bernstein | 317—234 X |
| 3,178,621 | 4/1965 | Glickman | 317—234 X |
| 3,183,407 | 5/1965 | Yasuda et al. | 317—234 X |

ANTHONY BARTIS, *Acting Primary Examiner.*

RICHARD M. WOOD, *Examiner.*

V. Y. MAYEWSKY, *Assistant Examiner.*